US009826105B2

(12) United States Patent
Sharma et al.

(10) Patent No.: US 9,826,105 B2
(45) Date of Patent: Nov. 21, 2017

(54) SPONSORING DATA USAGE AND USAGE OF CONTENT PROVIDER WEB SITES AND APPLICATIONS

(71) Applicant: Verizon Patent and Licensing Inc., Basking Ridge, NJ (US)

(72) Inventors: Manish Sharma, San Jose, CA (US); Kevin Flores, San Jose, CA (US); Devin Blong, Penngrove, CA (US); Tushar Chaudhary, Mountain View, CA (US); Annu Yadav, San Francisco, CA (US); Gurudutt Pai, North Andover, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/132,829

(22) Filed: Dec. 18, 2013

(65) Prior Publication Data

US 2015/0172899 A1 Jun. 18, 2015

(51) Int. Cl.
*H04M 11/00* (2006.01)
*H04M 15/00* (2006.01)

(52) U.S. Cl.
CPC ....... *H04M 15/8083* (2013.01); *H04M 15/09* (2013.01)

(58) Field of Classification Search
CPC ..... H04W 4/24; H04W 4/26; H04M 2215/32; H04M 15/00; H04M 2215/2026; H04M 17/00; H04M 15/09; H04M 15/8083; H04M 15/08; H04M 15/68; H04M 2215/0192; G06Q 20/123; G06Q 20/14
USPC ................ 455/406; 705/39, 40, 14.66–14.73
See application file for complete search history.

(56) References Cited

U.S. PATENT DOCUMENTS

| | | | | |
|---|---|---|---|---|
| 2008/0287096 | A1* | 11/2008 | Aaltonen et al. | 455/406 |
| 2010/0223096 | A1* | 9/2010 | Bosan et al. | 705/10 |
| 2012/0143697 | A1* | 6/2012 | Chopra | G06Q 30/0269 705/14.66 |
| 2012/0155380 | A1* | 6/2012 | Hodges | 370/328 |
| 2012/0158829 | A1* | 6/2012 | Ahmavaara et al. | 709/203 |
| 2012/0209753 | A1* | 8/2012 | Hodges | H04L 12/146 705/30 |
| 2012/0278229 | A1* | 11/2012 | Vishwanathan et al. | 705/40 |
| 2013/0316674 | A1* | 11/2013 | Cho et al. | 455/406 |
| 2013/0316703 | A1* | 11/2013 | Girard et al. | 455/432.1 |
| 2014/0024340 | A1* | 1/2014 | Raleigh | 455/406 |
| 2014/0323084 | A1* | 10/2014 | Menezes et al. | 455/406 |

* cited by examiner

*Primary Examiner* — Keith Fang
*Assistant Examiner* — B.M. M Hannan

(57) ABSTRACT

A device receives an identifier associated with a user device, and receives information associated with data usage by the user device. The device determines whether the data usage is sponsored by a sponsor based on the identifier and the information associated with the data usage. The sponsor sponsors data usage associated with particular content accessed by the user device. The device assigns charges for the data usage to an account associated with the user device when the data usage is not sponsored by the sponsor, or to an account associated with the sponsor when the data usage is sponsored by the sponsor.

20 Claims, 16 Drawing Sheets

Data structure (520)

| Campaign ID | Sponsor | Sponsor Account | Device IDs | Date Range | Content | Location | Time | Threshold |
|---|---|---|---|---|---|---|---|---|
| 123 | Company | 123456 | xxx-xxx-xxxx 172.16.234.1 | 1/1/2014 to 1/2/2014 | URL1 | N/A | N/A | N/A |
| 456 | Hotel | 789101 | yyy-yyy-yyyy | 12/15/2013 to 1/1/2014 | All data usage | Within 1 mile | N/A | N/A |
| 7890 | Sports Team | 234567 | 171.32.254.2 164.16.132.1 | 2/2/2014 to 3/2/2014 | All data usage | Within 2 miles | Game time | < 100 Gb |
| 3245 | Content provider | 448761 | zzz-zzz-zzzz aaa-aaa-aaaa | 3/3/2013 to 3/5/2014 | URL3, URL4 | N/A | Off peak hours | N/A |
| 673 | Airline | 839248 | 172.32.345.1 bbb-bbb-bbbb | 12/1/2013 to 1/19/2014 | URL5 | In airport | 9 AM to 3 PM | < 50 Gb |
| * * * | * * * | * * * | * * * | * * * | * * * | * * * | * * * | * * * |

| Campaign ID | Sponsor | Sponsor Account | Device IDs | Date Range | Content |
|---|---|---|---|---|---|
| 123 | Hotel | 789101 | yyy-yyy-yyyy | 12/15/2013 to 1/1/2014 | All data usage |
| *456* | *Company* | *123456* | *xxx-xxx-xxxx 172.16.234.1* | *1/1/2014 to 1/2/2014* | *From content server* |

700

800

| Campaign ID | Sponsor | Sponsor Account | Device IDs | Date Range | Content |
|---|---|---|---|---|---|
| *123* | *Hotel* | *789101* | *yyy-yyy-yyyy* | *12/15/2013 to 1/1/2014* | *All data usage* |
| 456 | Company | 123456 | xxx-xxx-xxxx 172.16.234.1 | 1/1/2014 to 1/2/2014 | From content server |

800

SPONSORING DATA USAGE AND USAGE OF CONTENT PROVIDER WEB SITES AND APPLICATIONS

BACKGROUND

A user may utilize a mobile device (e.g., a smart phone, a tablet computer, a laptop computer, etc.) to access and view content, such as, for example, a web site, a video, etc., provided by a content provider. The user may accrue data usage charges for accessing the content. Many employers permit employees to bring personally-owned mobile devices to their workplace, and to use those mobile devices to access privileged company information and applications. Such an arrangement may be referred to as bring your own device (BYOD). The employers may manually reimburse the employees for data usage charges accrued at the workplace if the employees submit paperwork (e.g., telephone bills) to the employers.

BRIEF DESCRIPTION OF THE DRAWINGS

FIG. 5B is a diagram of an example data structure that may be used in connection with the example process shown in FIG. 4;

DETAILED DESCRIPTION OF PREFERRED EMBODIMENTS

The following detailed description refers to the accompanying drawings. The same reference numbers in different drawings may identify the same or similar elements.

Figure 1:
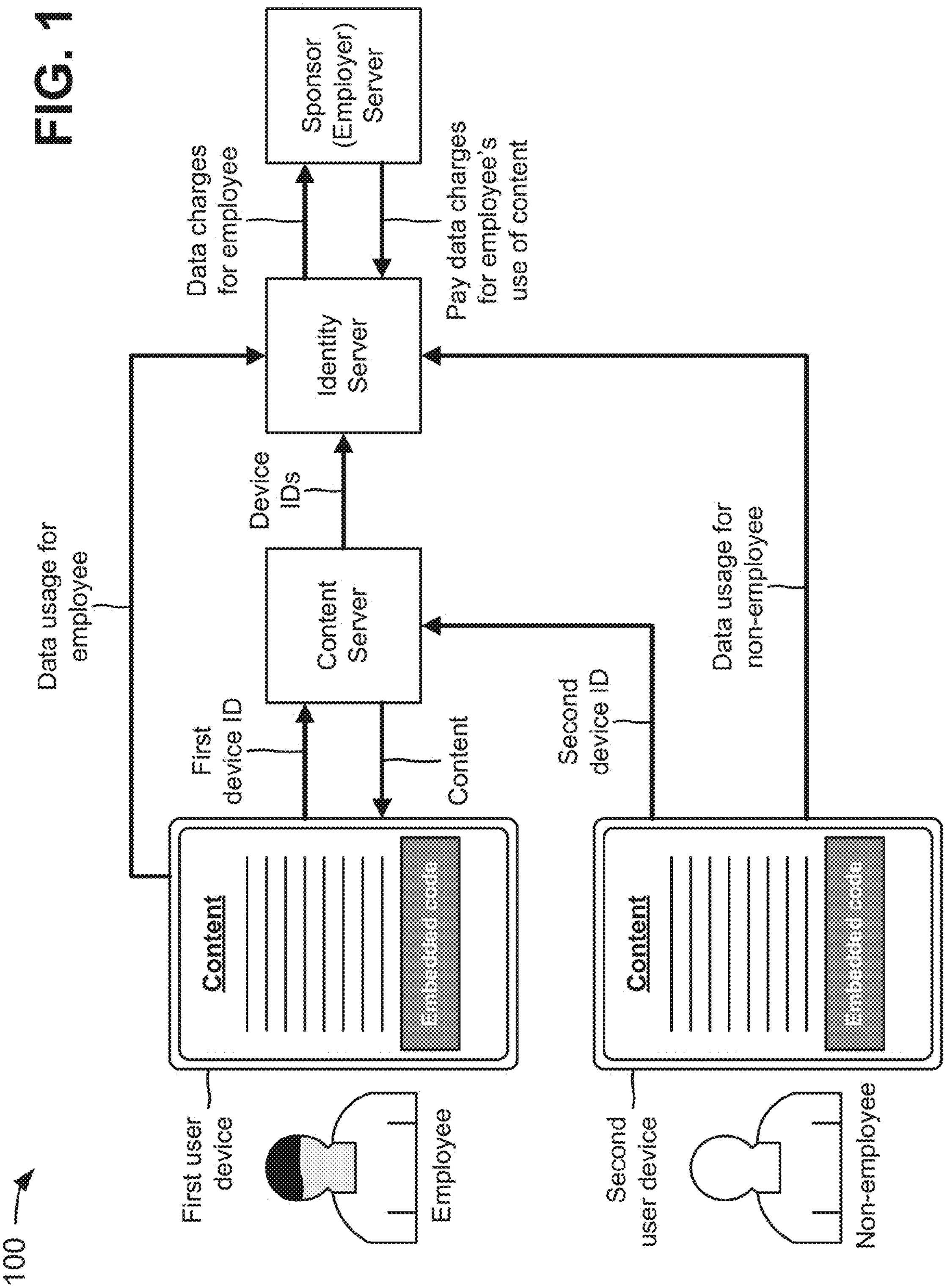
FIG. 1 is a diagram of an overview of an example implementation described herein.

FIG. 1 is a diagram of an overview of an example implementation 100 described herein. As shown in FIG. 1, assume that an employee of a company is associated with a first user device that receives content (e.g., provided by a content provider) from a content server. Further, assume that a non-employee of the company is associated with a second user device that also receives the content from the content server. In some implementations, the content provided to the user devices may include embedded code that causes the user devices to provide device identifiers of the user devices to the content server (e.g., with the permission of the users) and/or to an identity server. For example, the embedded code may cause the first user device to provide a first device identifier (ID) to the content server, and may cause the second user device to provide a second device ID to the content server, as shown in FIG. 1.

As further shown, the content server may forward the first and second device IDs to the identity server. As the first user device accesses and receives the content, data usage may be accrued for the employee and information identifying the employee's data usage (e.g., content accessed, time periods when content accessed, etc.) may be provided to the identity server. As the second user device accesses and receives the content, data usage may be accrued for the non-employee and information identifying the non-employee's data usage may be provided to the identity server.

Assume that the employer, via a sponsor server, created a sponsorship campaign with the identity server. The sponsorship campaign may indicate that the employer will sponsor data usage charges for the employee's use of the content received from the content server. The identity server may receive the device IDs, the information identifying the employee's data usage, and the information identifying the non-employee's data usage. Based on the second device ID, the identity server may determine that the non-employee's data usage is not covered by the sponsorship campaign, and may charge the non-employee's data usage to an account associated with the non-employee.

Based on the first device ID and the information identifying the employee's data usage, the identity server may determine that the employee's data usage, associated with the content, is covered by the sponsorship campaign. For example, the sponsorship campaign may cover the employee's use of the content received from the content server, but not the employee's use of the other content received from other sources. Based on this determination, the identity server may provide, to the sponsor server, information identifying data charges associated with the employee's use of the content. As further shown in FIG. 1, the sponsor server may pay the data charges for the employee's use of the content in accordance with the sponsorship campaign. The identity server may charge the employee's data usage, associated with the other content, to an account associated with the employee.

The systems and/or methods described herein may enable entities (e.g., sponsors) to fully or partially sponsor a user's data usage and/or charges associated with using one or more content providers' web pages, web sites, applications, content, etc. The user's data usage and/or charges associated with using one or more content providers' web pages, web sites, applications, content, etc. may be automatically handled, without the user submitting paperwork for reimbursement. The systems and/or methods may also enable the sponsors to define the sponsorship based on parameters, such as quantity of data used, time of day, specific users, content, portions or specific features of content, etc.

Content, as used herein, is to be broadly interpreted to include a web site, a web page, an application, a video, audio, an image, text, a software download, and/or a combination of a web site, a web page, an application, a video, audio, an image, text, and/or a software download.

Figure 2:
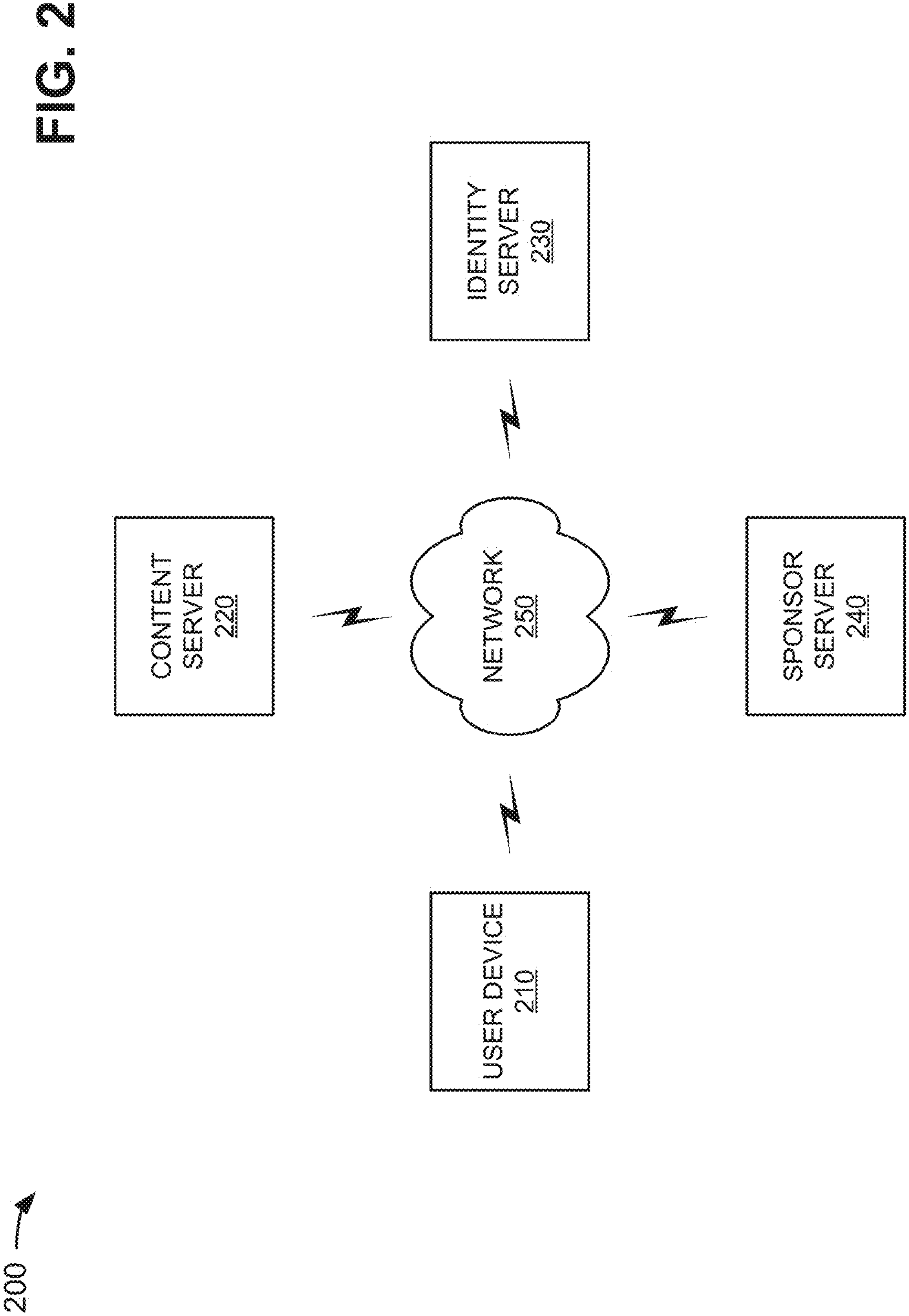
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, a content server 220, an identity server 230, a sponsor server 240, and a network 250. Devices/networks of environment 200 may interconnect via wired connections, wireless connections, or a combination of wired and wireless connections.

User device 210 may include a device that is capable of communicating over network 250 with content server 220, identity server 230, and/or sponsor server 240. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer, a landline telephone; a gaming device; or another type of computation and communication device.

Content server 220 may include one or more personal computers, workstation computers, server devices, or other types of computation and communication devices. In some implementations, content server 220 may provide content to user device 210 (e.g., via a web site and/or an application). In some implementations, the content may include embedded code that instructs user device 210 to provide an identifier (e.g., a mobile directory number (MDN), a mobile equipment identifier (MEID), an Internet protocol (IP) address, etc.) of user device 210 to content server 220 (e.g., with the permission of the user) and/or identity server 230 while user device 210 receives the content. In some implementations, the embedded code may be provided by identity server 230 to content server 220, and may enable content server 220 to support data usage sponsorship campaigns provided by one or more sponsors (e.g., associated with sponsor servers 240). In some implementations, the embedded code may include an application, a code snippet, a script, a widget, etc. that may enable content server 220 to support the data usage sponsorship campaigns.

Identity server 230 may include one or more personal computers, workstation computers, server devices, or other types of computation and communication devices. In some implementations, identity server 230 may be associated with a communication provider (e.g., an Internet service provider, a telecommunications service provider, a television service provider, etc.) of the user of user device 210. In some implementations, identity server 230 may identify the user of user device 210 based on an identifier (e.g., a MDN, a MEID, an IP address, etc.) associated with user device 210. In some implementations, identity server 230 may provide the embedded code to content server 220. The embedded code may instruct user device 210 to provide the identifier of user device 210 to content server 220 and/or identity server 230 while user device 210 receives the content from content server 220.

Sponsor server 240 may include one or more personal computers, workstation computers, server devices, or other types of computation and communication devices. In some implementations, sponsor server 240 may be associated with an entity (e.g., a company, a government agency, a university, a sports team, etc.) that sponsors data usage for users of user devices 210. For example, sponsor server 240 may be associated with a company that sponsors data usage of the company's employees; a company that sponsors data usage of spectators at a sporting event (e.g., a football game, a baseball game, etc.); a hotel that sponsors data usage of guests that stay at the hotel; etc. In some implementations, sponsor server 240 may also provide content to user device 210 in addition to or instead of content server 220. For example, if sponsor server 240 is associated with a company, sponsor server 240 may provide and/or sponsor content (e.g., a company intranet, company documents, etc.) that may be accessed by an employee (e.g., via user device 210).

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
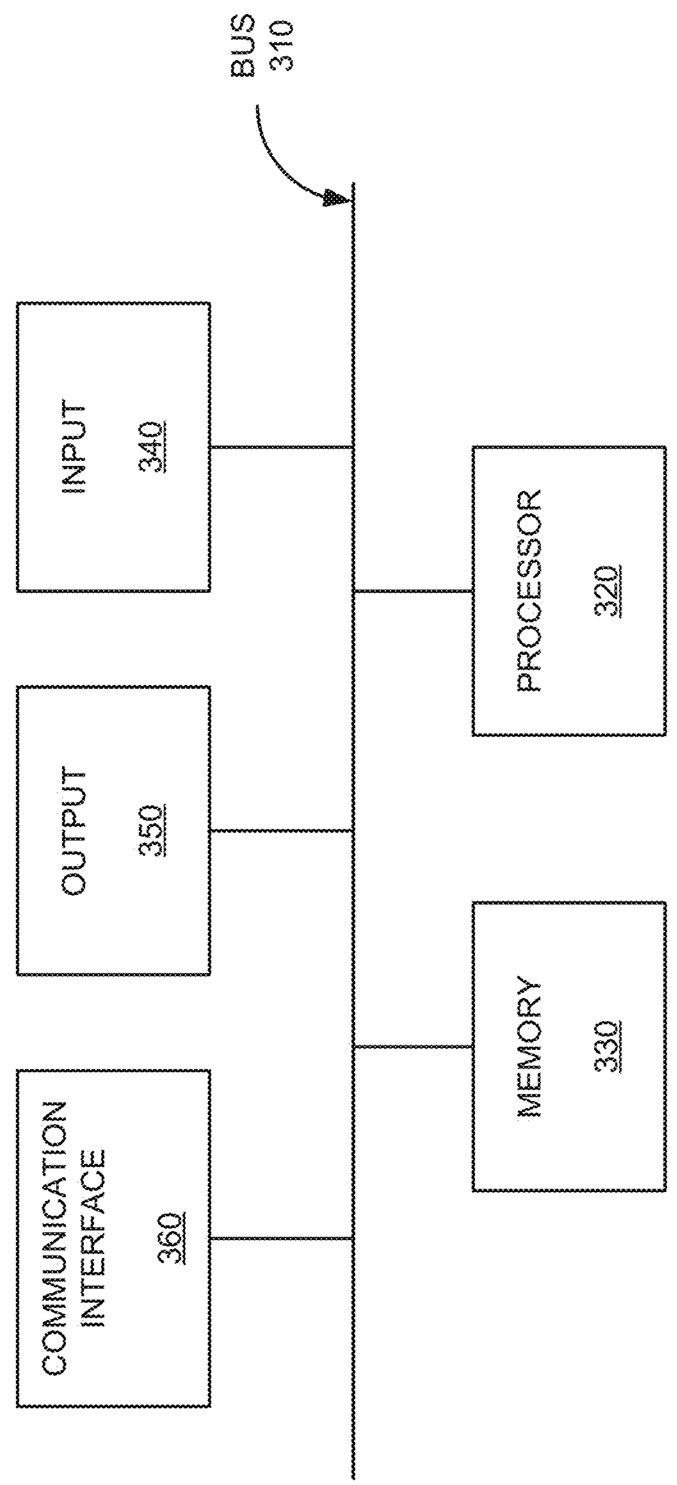
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
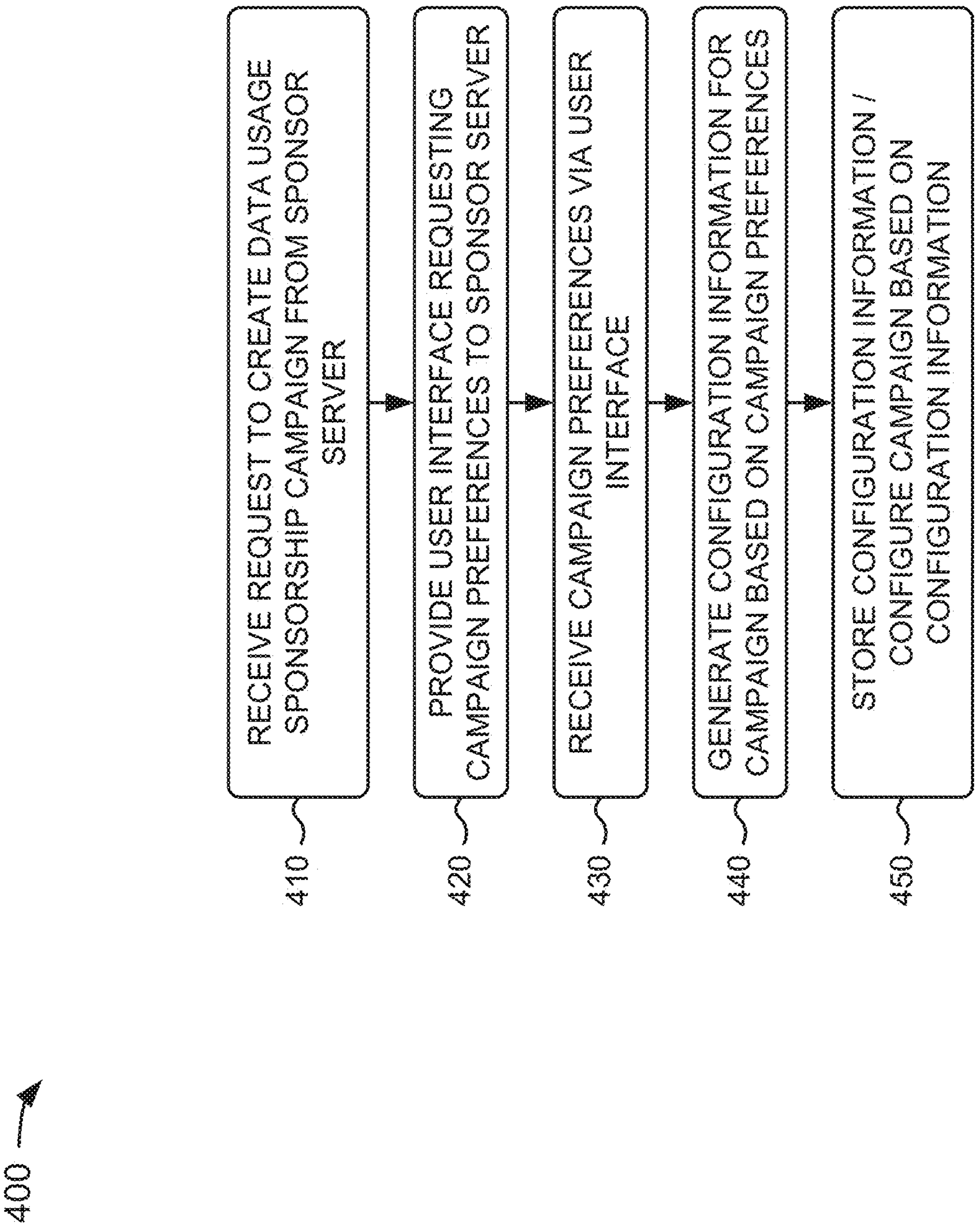
FIG. 4 is a flow chart of an example process for creating and configuring a data usage sponsorship campaign for a sponsor.

FIG. 4 is a flow chart of an example process 400 for creating and configuring a data usage sponsorship campaign for a sponsor. In some implementations, one or more process blocks of FIG. 4 may be performed by identity server 230. In some implementations, one or more process blocks of FIG. 4 may be performed by another device or a group of devices separate from or including identity server 230.

As shown in FIG. 4, process 400 may include receiving a request to create a data usage sponsorship campaign from a sponsor server (block 410). For example, a sponsor (e.g., a company, a hotel, etc.) may cause sponsor server 240 to provide a request to create a data usage sponsorship campaign to identity server 230, and identity server 230 may receive the request to create the data usage sponsorship campaign. In some implementations, the data usage sponsorship campaign may include a campaign where the sponsor pays for data usage by user device 210 based on a relationship between the sponsor and the user of user device. For example, the sponsor may pay for data usage when user device 210 accesses all content provided by content server 220, particular content provided by content server 220, any content, other content provided by other content providers, etc.

In some implementations, the sponsor may cause sponsor server 240 to access identity server 230 via, for example, a user interface (such as a browser) or in another manner. The sponsor may then select, using sponsor server 240, information regarding the data usage sponsorship campaign from the user interface to cause content server 220 to provide the request to create the data usage sponsorship campaign to identity server 230. In some implementations, identity server 230 may offer information for creating the data usage sponsorship campaign to sponsor server 240 without sponsor server 240 providing the request.

As further shown in FIG. 4, process 400 may include providing a user interface requesting campaign preferences to the sponsor server (block 420). For example, identity server 230 may provide a user interface, requesting data usage sponsorship campaign preferences, to sponsor server 240 based on the request. In some implementations, the user interface may request a variety of information associated with the campaign preferences. For example, the user interface may request a name of the sponsor, contact information for the sponsor, an address of the sponsor, a telephone number for the sponsor, account information of the sponsor (e.g., billing information for the sponsor, a tax identification of the sponsor, etc.), etc. In some implementations, identity server 230 may previously obtain the aforementioned information if the sponsor establishes an account with identity server 230.

In some implementations, the user interface may request identifiers of user devices 210 to associate with the campaign. For example, if the sponsor is an employer creating a campaign for the employer's employees (e.g., sponsoring all data usage by the employees), the employer may provide identifiers of user devices 210 associated with the employees via the user interface. In some implementations, the user interface may request a date range for the campaign. For example, if the sponsor is a hotel creating a campaign for a hotel guest (e.g., sponsoring data usage by the hotel guest), the hotel may provide a date range associated with when the hotel guest is staying at the hotel (e.g., from Dec. 1, 2013 to Dec. 4, 2013) via the user interface.

In some implementations, the user interface may request content to associate with the campaign. For example, if the sponsor is an employer creating a campaign for an employee of the employer, the employer may indicate, via the user interface, that the employer is sponsoring all data usage of the employee, data usage of particular content by the employee, data usage of only the employer's content, etc. In some implementations, the user interface may request a location range for the campaign. For example, if the sponsor is a bank creating a campaign for fans attending a football game at a stadium, the bank may indicate, via the user interface, that the bank is sponsoring data usage for the fans that are physically or geographically located within the stadium during the football game.

In some implementations, the user interface may request a time range for the campaign. For example, if the sponsor is a restaurant creating a campaign for the patrons of the restaurant when the restaurant is open, the restaurant may indicate, via the user interface, that the restaurant is sponsoring data usage for the patrons that are physically or geographically located within the restaurant between the hours of 9:00 AM and 3:00 PM (e.g., when the restaurant is open). In some implementations, the user interface may request a data usage threshold for the campaign. For example, if the sponsor is an employer creating a campaign for an employee of the employer, the employer may indicate, via the user interface, that the employer is sponsoring all data usage of the employee up to a particular data usage threshold (e.g., less than or equal to a particular number of bits, gigabits (Gbits), etc.).

In some implementations, a type of the account, of the sponsor, may determine the quantity of campaign preferences that the sponsor is able to identify via the user interface. For example, the user interface may enable the content provider to identify only a portion of the above preferences or identify additional preferences based on the type of the account with which the sponsor is associated.

As further shown in FIG. 4, process 400 may include receiving the campaign preferences via the user interface (block 430). For example, the sponsor may cause sponsor server 240 to provide, to identity server 230, information identifying the one or more preferences relating to the data usage sponsorship campaign and provided via the user interface. Identity server 230 may receive the one or more preferences relating to the data usage sponsorship campaign.

As further shown in FIG. 4, process 400 may include generating configuration information for the campaign based on the preferences (block 440). For example, identity server 230 may generate configuration information based on the one or more preferences relating to the data usage sponsorship campaign. In some implementations, the configuration information may include information that indicates the name of the sponsor, the contact information for the sponsor, the address of the sponsor, the telephone number for the sponsor, the account information of the sponsor, etc.

In some implementations, the configuration information may include information that provides the identifiers of user devices 210 associated with the data usage sponsorship campaign. In some implementations, the configuration information may include information that indicates the date range for the data usage sponsorship campaign. In some implementations, the configuration information may include information that indicates content to associate with the data usage sponsorship campaign. In some implementations, the configuration information may include information that indicates the location range for the data usage sponsorship campaign. In some implementations, the configuration information may include information that indicates the time range for the data usage sponsorship campaign. In some implementations, the configuration information may include information that indicates the data usage threshold for the data usage sponsorship campaign.

As further shown in FIG. 4, process 400 may include storing the configuration information and configuring the campaign based on the configuration information (block 450). For example, identity server 230 may store all or a portion of the configuration information generated by identity server 230 (e.g., in a data structure). In some implementations, identity server 230 may configure the data usage sponsorship campaign based on all or a portion of the stored configuration information.

In some implementations, sponsor server 240 may provide updates, to the one or more preferences relating to the data usage sponsorship campaign, to identity server 230 based on execution of the data usage sponsorship campaign. For example, sponsor server 240 may provide updates to the one or more preferences when user devices 210 associated with the campaign need to be changed (e.g., a hotel guest leaves the hotel, an employee leaves a company, a new employee joins a company, etc.). In another example, sponsor server 240 may provide updates to the one or more preferences when other conditions associated with the campaign change (e.g., an employer may want to expand the content covered by the campaign, a restaurant may want to restrict data usage to a particular threshold, etc.). Identity server 230 may generate updates to the configuration information based on the updated preferences, and may store the updates to the configuration information. In some implementations, sponsor server 240 may provide the updates periodically based on a preference of the sponsor and/or based on a time frequency determined by sponsor server 240. In some implementations, sponsor server 240 may determine whether to provide the updates based on the type of the account associated with the sponsor.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
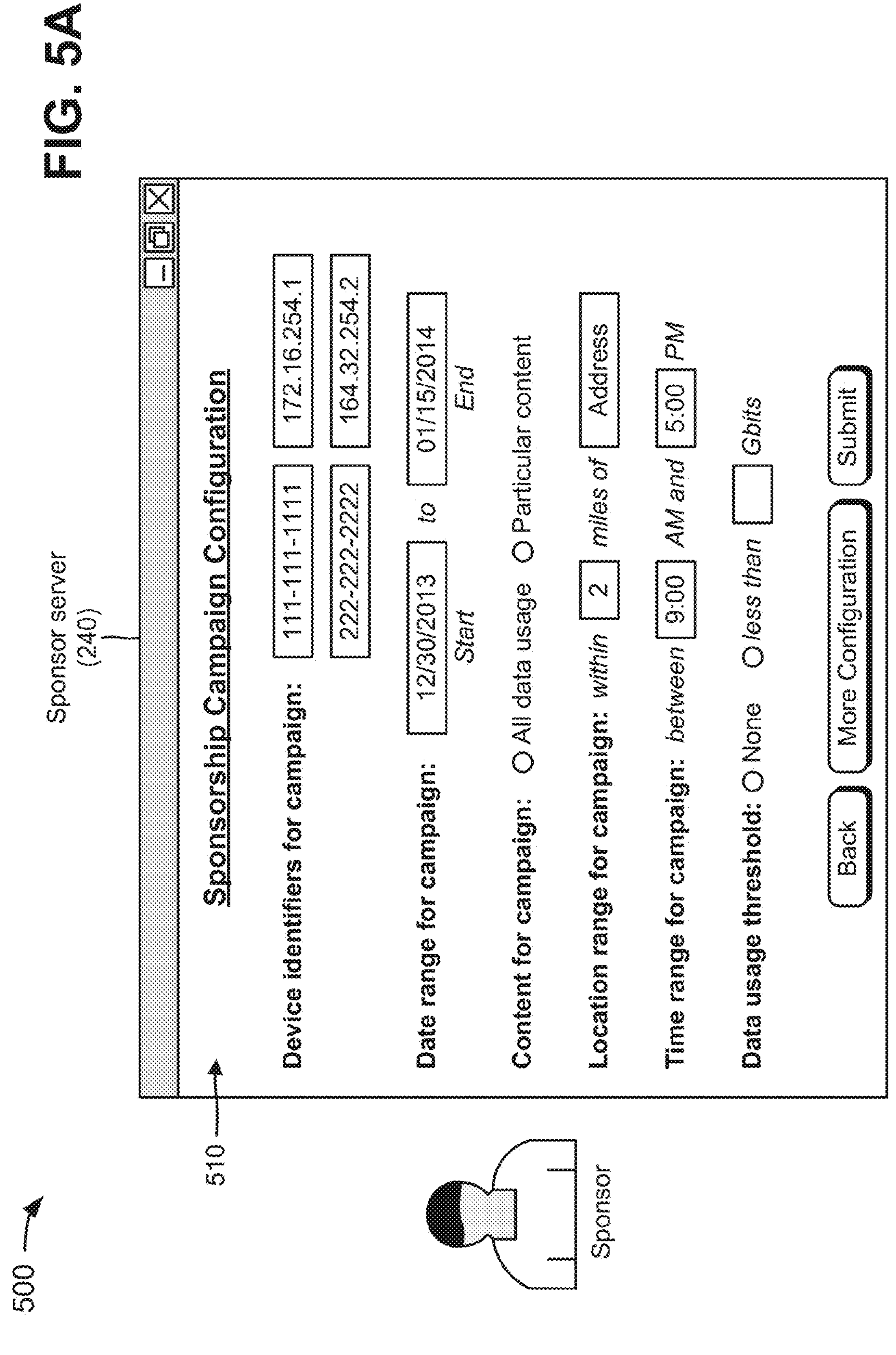
FIG. 5A is a diagram of an example user interface that may be used in connection with the example process shown in FIG. 4.

FIG. 5A is a diagram 500 of an example user interface 510 that may be used in connection with example process 400 shown in FIG. 4. In some implementations, user interface 510 may be provided by identity server 230 to sponsor server 240 to enable a sponsor to identify information (e.g., preferences) that may be used to configure a data usage sponsorship campaign.

As shown in FIG. 5A, user interface 510 may allow the sponsor to configure different features of the data usage sponsorship campaign. For example, the sponsor may identify one or more preferences for initiation of the data usage sponsorship campaign. In some implementations, the sponsor may indicate device identifiers of user devices 210 to associate with the data usage sponsorship campaign via user interface 510. For example, as shown in FIG. 5A, the sponsor may identify two MDNs (e.g., 111-111-1111 and 222-222-2222) and two IP addresses (e.g., 172.16.254.1 and 164.32.254.2) as device identifiers of user devices 210 to associate with the data usage sponsorship campaign. In another example, the sponsor may upload a spreadsheet of device identifiers to associate with the data usage sponsorship campaign. In some implementations, the sponsor may indicate a date range for the data usage sponsorship campaign via user interface 510. For example, as shown in FIG. 5A, the sponsor may indicate a start date of Dec. 30, 2013 and an end date of Jan. 15, 2014 for the date range of the data usage sponsorship campaign.

In some implementations, the sponsor may indicate content to associate with the data usage sponsorship campaign via user interface 510. For example, as shown in FIG. 5A, the sponsor may indicate that the sponsor is sponsoring all data usage or particular content for the data usage sponsorship campaign. In some implementations, the sponsor may indicate a location range for the data usage sponsorship campaign via user interface 510. For example, as shown in FIG. 5A, the sponsor may indicate that the data usage sponsorship campaign covers designated user devices 210 that are physically or geographically located within two miles of a particular address.

In some implementations, the sponsor may indicate a time range for the data usage sponsorship campaign via user interface 510. For example, as shown in FIG. 5A, the sponsor may indicate that the sponsor is sponsoring data usage by designated user devices 210 between the hours of 9:00 AM and 5:00 PM. In some implementations, the sponsor may indicate a data usage threshold for the data usage sponsorship campaign via user interface 510. For example, as shown in FIG. 5A, the sponsor may indicate that the data usage sponsorship campaign covers data usage by designated user devices 210 up to a particular data usage threshold (e.g., less than a particular number of Gbits).

Once the sponsor has identified the preferences, user interface 510 may allow the sponsor to select a "Submit" option to store the preferences and/or submit the preferences to identity server 230. Identity server 230 may then generate configuration information based on the preferences.

As further shown in FIG. 5A, user interface 510 may also allow the sponsor to select a "Back" option to cause identity server 230 to provide information regarding the data usage sponsorship campaign. As also shown in FIG. 5A, user interface 510 may also allow the sponsor to select a "More Configuration" option to enable the sponsor to identify additional information that may be used to configure the data usage sponsorship campaign.

The number of elements of user interface 510 shown in FIG. 5A is provided for explanatory purposes. In practice, user interface 510 may include additional elements, fewer elements, different elements, or differently arranged elements than those shown in FIG. 5A.

FIG. 5B is a diagram 500 of an example data structure 520 that may be used in connection with example process 400 shown in FIG. 4. In some implementations, data structure 520 may be created, maintained, and/or stored by identity server 230, and may be used to implement a data usage sponsorship campaign. In some implementations, data structure 520 may be created, maintained, and/or stored by another device or a group of devices separate from or including identity server 230. In some implementations, data structure 520 may include a database, a table, a list, an array, etc.

As shown in FIG. 5B, data structure 520 may include a table with a campaign identifier (ID) field, a sponsor field, a sponsor account field, a device IDs field, a date range field, a content field, a location field, a time field, a threshold field, and various entries associated with the fields. In some implementations, data structure 520 may include a different type of data structure, different fields, additional fields, and/or differently arranged fields.

The campaign ID field may include identifiers assigned to different data usage sponsorship campaigns by identity server 230. In some implementations, a sponsor may be associated with one or more campaign IDs that correspond to one or more data usage sponsorship campaigns created by the sponsor. For example, as shown in FIG. 5B, a company may be associated with a first campaign ID (e.g., "123"), a hotel may be associated with a second campaign ID (e.g., "456"), etc.

The sponsor field may include information associated with a sponsor of a data usage sponsorship campaign identified in campaign ID field. In some implementations, the information associated with the sponsor may include a name of the sponsor, a physical address of the sponsor, contact information of the sponsor, billing information of the sponsor, etc. For example, as shown in FIG. 5B, the company may be associated with the first campaign ID, the hotel may be associated with the second campaign ID, a sports team may be associated with the third campaign ID, etc.

The sponsor account field may include an account associated with the sponsor identified in the sponsor field. In some implementations, the account may include a billing account, of the sponsor, to which to charge the sponsor for data usage associated with a data usage sponsorship campaign identified in the campaign ID field. For example, as shown in FIG. 5B, the company may include a billing account (e.g., "123456") associated with the first campaign ID, the hotel may include a billing account (e.g., "789101") associated with the second campaign ID, etc.

The device IDs field may include one or more device identifiers of user devices 210 associated with a data usage sponsorship campaign identified in campaign ID field. In some implementations, the device identifiers may include MDNs, MEIDs, IP addresses, telephone numbers, etc. of user devices 210 associated with the data usage sponsorship campaign. For example, as shown in FIG. 5B, a MDN (e.g., "xxx-xxx-xxxx") and an IP address (e.g., "172.16.234.1") may be associated with the first campaign ID, a telephone number (e.g., "yyy-yyy-yyyy") may be associated with the second campaign ID, etc.

The date range field may include a date range associated with a data usage sponsorship campaign identified in the campaign ID field. In some implementations, the date range may define a date when a data usage sponsorship campaign, identified in the campaign ID field, is effective. For example, as shown in FIG. 5B, the data usage sponsorship campaign associated with the first campaign ID may be effective from Jan. 1, 2014 to Jan. 2, 2014, the data usage sponsorship campaign associated with the second campaign ID may be effective from Dec. 15, 2013 to Jan. 1, 2014, etc.

The content field may include information associated with content that is to be sponsored by a data usage sponsorship campaign identified in the campaign ID field. In some implementations, the information associated with the content may include one or more web site addresses (e.g., uniform resource locators (URLs)), web page addresses, information indicating all data usage, etc. For example, as shown in FIG. 5B, the data usage sponsorship campaign associated with the first campaign ID may cover a single URL (e.g., "URL1"), the data usage sponsorship campaign associated with the second campaign ID may cover all data usage, etc.

The location field may include information identifying a location associated with a data usage sponsorship campaign identified in the campaign ID field. In some implementations, the location field may include information indicating that the data usage sponsorship campaign, identified in the campaign ID field, covers designated user devices 210 that are physically located within a particular distance of a particular address. For example, as shown in FIG. 5B, the data usage sponsorship campaign associated with the first campaign ID may not be limited to a particular location, the data usage sponsorship campaign associated with the second campaign ID may be limited to data usage within one mile of a particular address (e.g., an address of the hotel), etc.

The time field may include information identifying a time range associated with a data usage sponsorship campaign identified in the campaign ID field. In some implementations, the time field may include information indicating that the data usage sponsorship campaign, identified in the campaign ID field, covers data usage by designated user devices 210 between a particular time period. For example, as shown in FIG. 5B, the data usage sponsorship campaigns associated with the first campaign ID and the second campaign ID may not be limited to a particular time range, the data usage sponsorship campaign associated with the third campaign ID may be limited to data usage during a time a game is being played, etc.

The threshold field may include information identifying a data usage threshold associated with a data usage sponsorship campaign identified in the campaign ID field. In some implementations, the threshold field may include information indicating that the data usage sponsorship campaign, identified in the campaign ID field, covers data usage by designated user devices 210 up to a particular data usage threshold. For example, as shown in FIG. 5B, the data usage sponsorship campaigns associated with the first campaign ID and the second campaign ID may not be limited to a particular data usage threshold, the data usage sponsorship campaign associated with the third campaign ID may be limited to a data usage threshold of less than a particular amount (e.g., "100 Gb"), etc.

Figure 6:
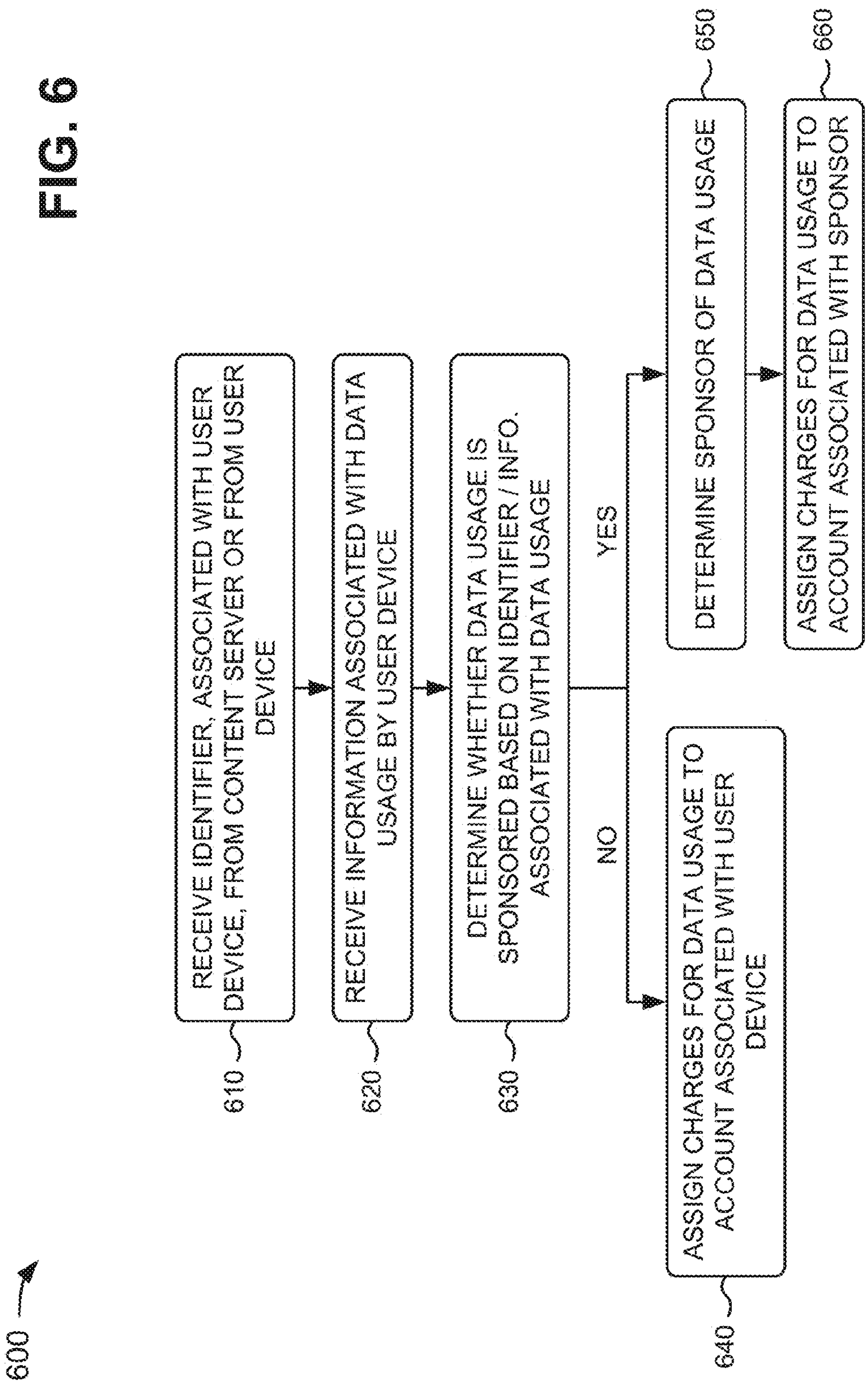
FIG. 6 is a flow chart of an example process for sponsoring data usage and usage of content provider web sites and/or applications.

FIG. 6 is a flow chart of an example process 600 for sponsoring data usage and usage of content provider web sites and/or applications. In some implementations, one or more process blocks of FIG. 6 may be performed by identity server 230. In some implementations, one or more process blocks of FIG. 6 may be performed by another device or a group of devices separate from or including identity server 230.

As shown in FIG. 6, process 600 may include receiving an identifier, associated with a user device, from a content server or from the user device (block 610). For example, a user may utilize user device 210 to access content provided by content server 220. In some implementations, user device 210 may access a web site, a web page, an application, etc. that includes content provided by content server 220, and may display the content to the user. For example, the user may provide, to user device 210, an address (e.g., URL) associated with a web page provided by content server 220, and user device 210 may access the content via the web page and based on the address. In some implementations, the content may include embedded code that causes user device to provide a device identifier (e.g., a MDN, a MEID, an IP address, etc.) of user device 210 to content server 220 (e.g., with the permission of the user) and/or to identity server 230. In some implementations, the device identifier may be encrypted so that content server 220 may not be able to determine the device identifier.

If user device 210 provides the device identifier to content server 220, content server 220 may forward the device identifier to identity server 230, along with information associated with the content. In some implementations, if the device identifier is encrypted, identity server 230 may decrypt the device identifier (e.g., based on sharing encryption keys with user device 210). In some implementations, user device 210 may provide the device identifier to identity server 230 based on user device 210 utilizing a service (e.g., a telecommunications service, an Internet service, etc.) associated with identity server 230. Identity server 230 may receive the device identifier of user device 210 from content server 220 and/or from user device 210.

As further shown in FIG. 6, process 600 may include receiving information associated with data usage by the user device (block 620). For example, as user device 210 accesses the content from content server 220, data usage may be accrued for user device 210. In some implementations, user device 210 may access other content from other sources, and data usage may be accrued as user device 210 accesses the other content. In some implementations, user device 210 may generate information associated with the data usage, such as, for example, information identifying an amount of data usage by user device 210, information identifying the content accessed by user device 210, information identifying a date(s) when the content is accessed by user device 210, information identifying a location(s) of user device 210 when the content is accessed by user device 210, information identifying a time period(s) when the content is accessed by user device 210, etc.

In some implementations, user device 210 may provide the information associated with the data usage to identity server 230, and identity server 230 may receive the information associated with the data usage. In some implementations, content server 220 may generate the information associated with the data usage of user device 210 (e.g., since content server 220 may host sponsored content). In such implementations, content server 220 may provide the information associated with the data usage to identity server 230, and identity server 230 may receive the information associated with the data usage. In some implementations, identity server 230 may store the information associated with the data usage of user device 210 in storage associated with identity server 230 (e.g., in memory 330, FIG. 3).

As further shown in FIG. 6, process 600 may include determining whether the data usage is sponsored based on the identifier and the information associated with the data usage (block 630). For example, identity server 230 may determine whether the data usage of user device 210 is sponsored, by a sponsor, based on the device identifier of user device 210 and based on the information associated with the data usage. In some implementations, identity server 230 may include or be associated with a data structure (e.g., data structure 520) that includes information associated with data usage sponsorship campaigns. For example, the data structure may include IDs associated with the data usage sponsorship campaigns; sponsor information associated with the data usage sponsorship campaigns; device identifiers (e.g., MDNs, MEIDs, etc.) associated with the data usage sponsorship campaigns; and/or other information associated with the data usage sponsorship campaigns (e.g., date ranges, location ranges, etc.). Identity server 230 may compare the device identifier of user device 210 with the device identifiers provided in the data structure, and the information associated with the data usage of user device 210 with the other information provided in the data structure, in order to determine whether the data usage of user device 210 is sponsored.

In some implementations, if the device identifier of user device 210 matches a particular device identifier in the data structure, identity server 230 may identify a particular data usage sponsorship campaign associated with the particular device identifier. Identity server 230 may then compare the information associated with the data usage of user device 210 with the other information, associated with the particular campaign and provided in data structure 520, in order to determine whether the data usage of user device 210 meets the requirements of the other information.

As further shown in FIG. 6, if the data usage is not sponsored (block 630—NO), process 600 may include assigning charges for the data usage to an account associated with the user device (block 640). For example, if identity server 230 determines that the data usage of user device 210 is not sponsored, identity server 230 may assign charges for the data usage of user device 210 to an account associated with user device 210. In some implementations, identity server 230 may determine that the data usage of user device 210 is not sponsored when the device identifier of user device 210 does not match a device identifier provided in data structure 520. In some implementations, identity server 230 may determine that the data usage of user device 210 is not sponsored when the device identifier of user device 210 matches a device identifier provided in data structure 520, but the data usage of user device 210 does not meet one or more of the requirements of the other information provided in data structure 520. For example, assume that the device identifier of user device 210 is associated with a particular data usage sponsorship campaign, provided in data structure 520. However, assume that the data usage of user device 210 occurs during a date not within a date range associated with the particular data usage sponsorship campaign. In such an example, identity server 230 may determine that the data usage of user device 210 is not sponsored because the data usage of user device 210 does not meet the date range requirement of the campaign.

In some implementations, if identity server 230 determines that the data usage of user device 210 is not sponsored, identity server 230 may assign charges for the data usage of user device 210 to an account associated with user device 210. For example, the user of user device 210 may have established an account with identity server 230 for a service (e.g., a telecommunications service, an Internet service, a television service, etc.) provided by identity server 230 to user device 210. In such an example, identity server 230 may assign the charges for the data usage of user device 210 to the user's account. In some implementations, identity server 230 may generate a bill for the user's account, and the entity associated with identity server 230 may provide the bill to the user.

As further shown in FIG. 6, if the data usage is sponsored (block 630—YES), process 600 may include determining a sponsor of the data usage (block 650). For example, if identity server 230 determines that the data usage of user device 210 is sponsored, identity server 230 may determine a sponsor of the data usage of user device 210. In some implementations, identity server 230 may determine that the data usage of user device 210 is sponsored when the device identifier of user device 210 matches a device identifier provided in data structure 520, and the data usage of user device 210 meets the requirements of the other information, associated with the matching device identifier, provided in data structure 520. For example, assume that the device identifier of user device 210 is associated with a particular data usage sponsorship campaign, provided in data structure 520. Further, assume that the data usage of user device 210 occurs during a date within a date range associated with the particular data usage sponsorship campaign, and at a location within a location range associated with the particular data usage sponsorship campaign. In such an example, identity server 230 may determine that the data usage of user device 210 is sponsored because the data usage of user device 210 meets the date range requirement and the location range requirement of the campaign.

In some implementations, if identity server 230 determines that the data usage of user device 210 is sponsored, identity server 230 may identify a sponsor associated with the data usage sponsorship campaign. For example, identity server 230 may identify, in data structure 520, a particular data usage sponsorship campaign associated with the device identifier of user device 210, and may further identify, in data structure 520, a particular sponsor based on the particular data usage sponsorship campaign.

As further shown in FIG. 6, process 600 may include assigning the charges for the data usage to an account associated with the sponsor (block 660). For example, if identity server 230 determines that the data usage of user device 210 is sponsored by a sponsor, identity server 230 may assign charges for the data usage of user device 210 to an account associated with the sponsor. In some implementations, if identity server 230 determines that the data usage of user device 210 is sponsored, identity server 230 may assign charges for the data usage of user device 210 to an account associated with sponsor server 240. For example, a sponsor of sponsor server 240 may have established an account with identity server 230 for sponsoring data usage by one or more user devices 210. In such an example, identity server 230 may assign the charges for the data usage of user device 210 to the sponsor's account. In some implementations, identity server 230 may generate a bill for the sponsor's account, and the entity associated with identity server 230 may provide the bill to the sponsor.

In some implementations, content server 220 may receive a campaign ID from identity server 230. In such implementations, the campaign ID may be associated with a data usage sponsorship campaign that sponsors data usage by user devices 210 determined by content server 220. Content server 220 may determine a particular user device 210 to which to provide the campaign ID, and may provide the campaign ID to the particular user device 210 via content generated by content server 220. In some implementations, content server 220 may authenticate the particular user device 210 before providing the campaign ID to the particular user device 210. As the particular user device 210 accesses the content from content server 220, data usage may be accrued for the particular user device 210. In some implementations, the particular user device 210 may generate information associated with the data usage, such as, for example, information identifying an amount of data usage by the particular user device 210, information identifying the content accessed by the particular user device 210, information identifying a location(s) of the particular user device 210 when the content is accessed by the particular user device 210, the campaign ID, etc. In such implementations, identity server 230 may utilize the campaign ID as a basis for sponsoring the data usage of the content by the particular user device 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
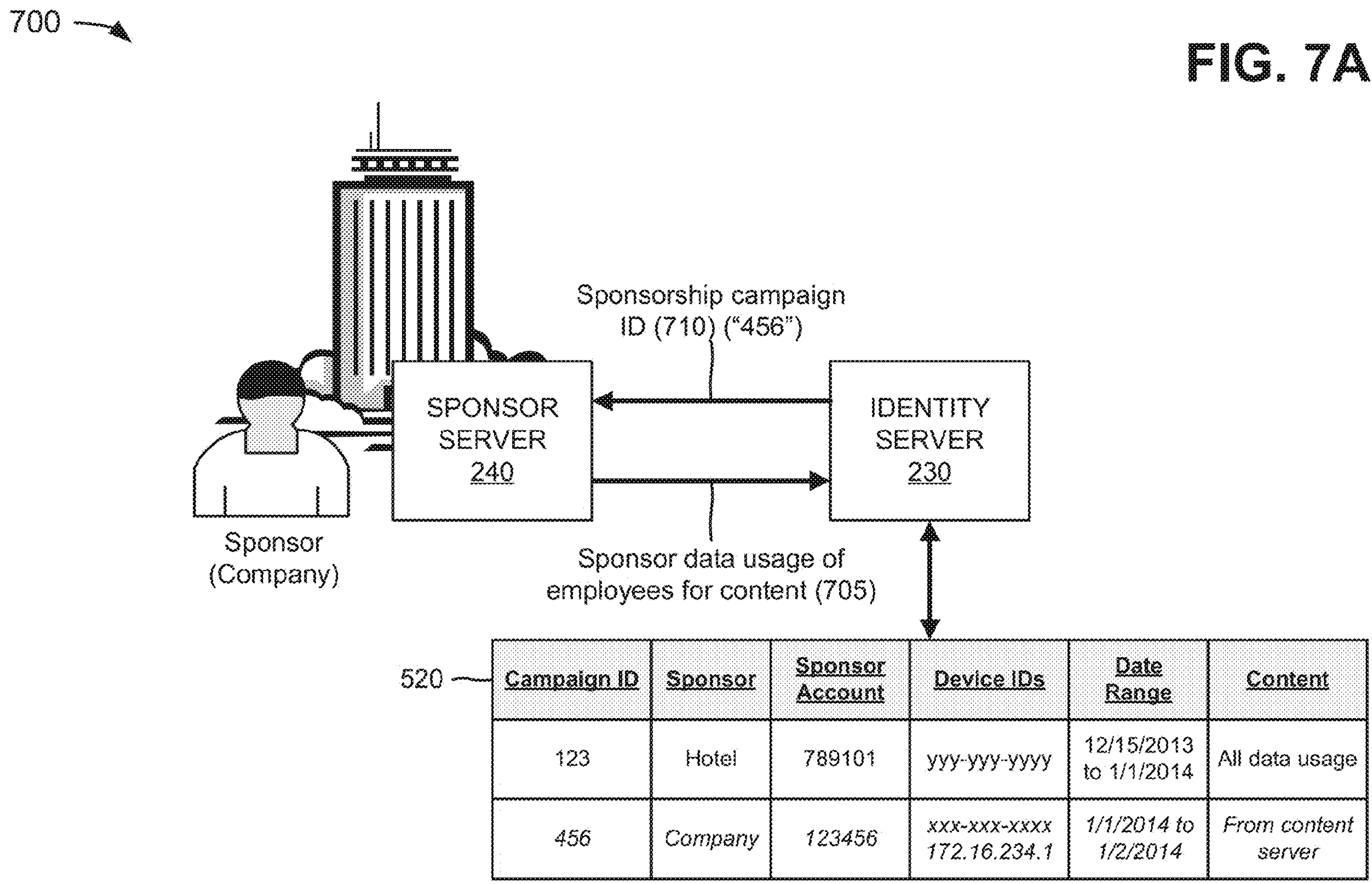
FIG. 7A-7D are diagrams of an example relating to the example process shown in FIG. 6.

FIGS. 7A-7D are diagrams of an example 700 relating to example process 600 shown in FIG. 6. In example 700, assume that a sponsor (e.g., a company) is associated with sponsor server 220, as shown in FIG. 7A. Further, assume that the company utilizes sponsor server 240 to sponsor data usage by the company's employees for particular content, as indicated by reference number 705. For example, the company may utilize sponsor server 240 to access a user interface (e.g., user interface 510, FIG. 5A), provided by identity server 230, that enables the company to create a data usage sponsorship campaign for the employees. As shown in FIG. 7A, identity server 230 may store the data usage sponsorship campaign in data structure 520. The data usage sponsorship campaign may include particular device IDs (e.g., "xxx-xxx-xxxx" and "172.16.234.1"), a date range (e.g., Jan. 1, 2014 to Jan. 2, 2014), and particular content (e.g., content received from content server 220). As further shown in FIG. 7A, identity server 230 may assign a sponsorship campaign ID 710 (e.g., "456") to the data usage sponsorship campaign, and may provide sponsorship campaign ID 710 to sponsor server 240.

Figure 7B:
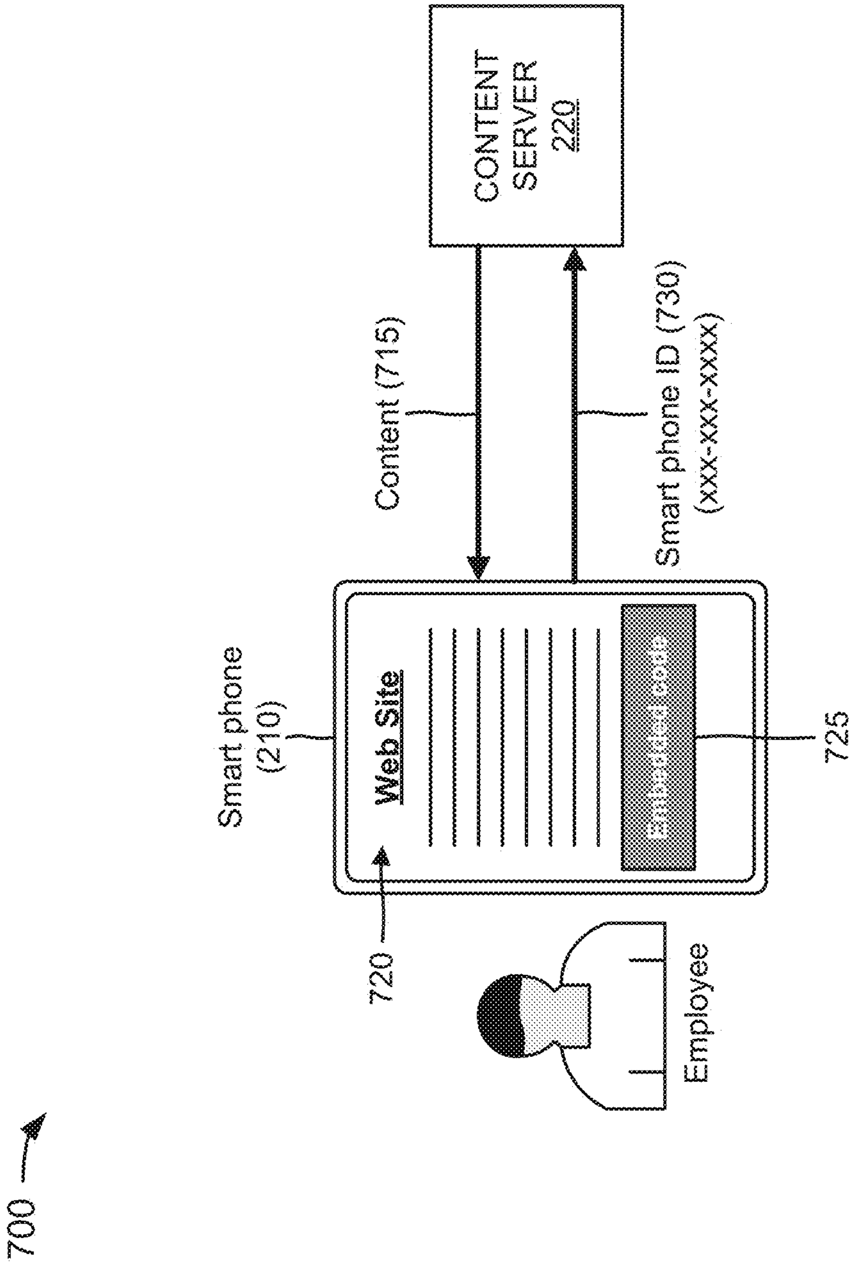

Now assume that an employee of the company is associated with a user device 210 (e.g., a smart phone 210), as shown in FIG. 7B. Further, assume that the employee utilizes smart phone 210 to access content 715 provided by content server 220. For example, the employee may access a web site 720 of content server 220, and smart phone 210 may display web site 720 to the employee. As further shown in FIG. 7B, web site 720 may include embedded code 725 that causes smart phone 210 to provide an identifier (ID) 730 (e.g., "xxx-xxx-xxxx") of smart phone 210 to content server 220 (e.g., with the employee's permission and/or in an encrypted format).

Figure 7C:
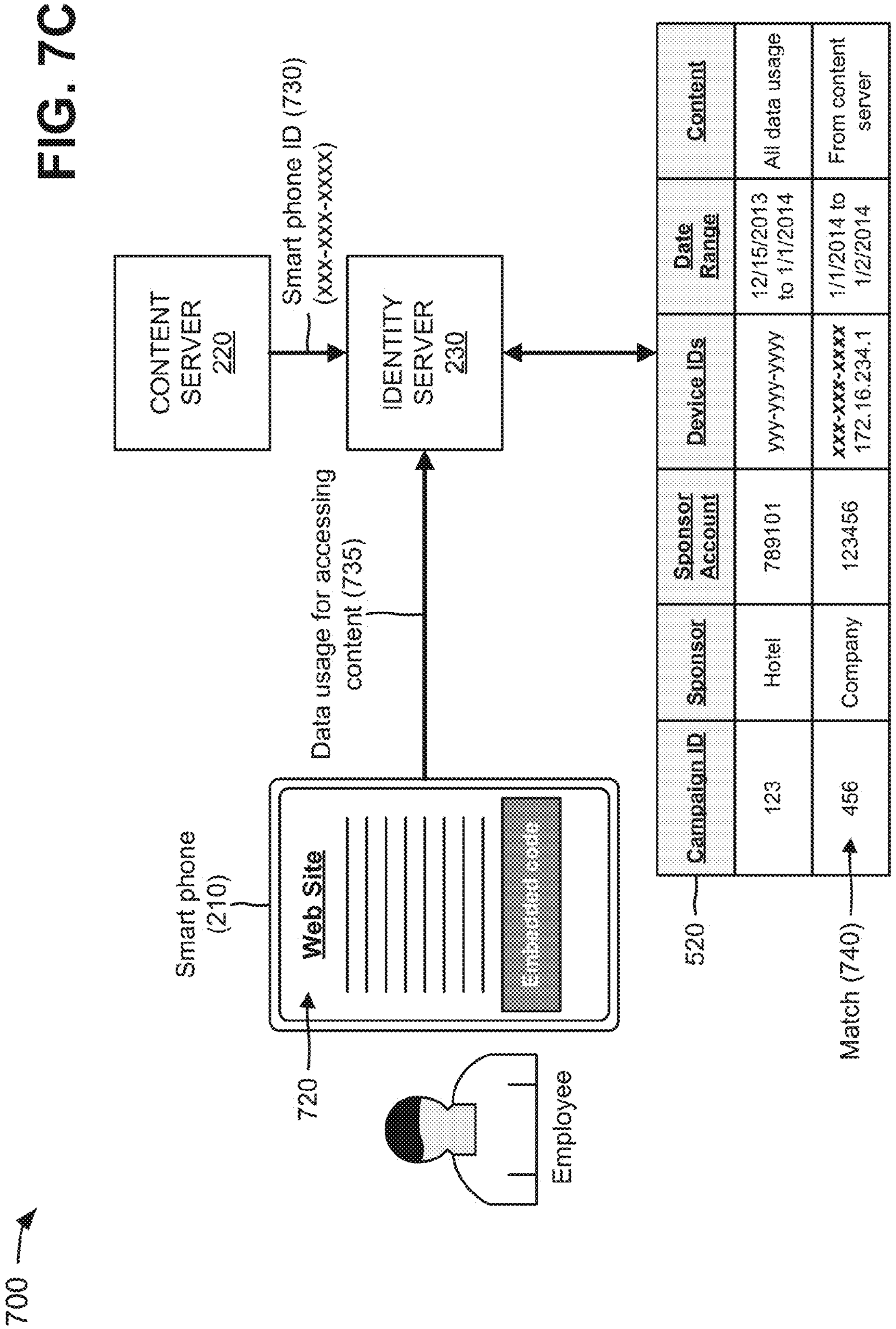

As shown in FIG. 7C, content server 220 may forward identifier 730 of smart phone 210 to identity server 230, and identity server 230 may decrypt identifier 730 if identifier 730 is encrypted. While smart phone 210 accesses web site 720, smart phone 210 may accrue data usage, and information 735 associated with the data usage of web site 720 may be provided to identity server 230, as further shown in FIG. 7C. In some implementations, information 735 may include an address of web site 720, date and time information associated with the access of web site 720, location information of smart phone 210, etc. In example 700, assume that the employee accesses web site 720 on Jan. 1, 2014. Identity server 230 may compare identifier 730 and information 735 with information provided in data structure 520 in order to determine whether smart phone's 210 data usage for accessing web site 720 is sponsored. As further shown in FIG. 7C, identity server 230 may determine that smart phone's 210 data usage for accessing web site 720 is sponsored since identifier 730 and information 735 match information provided in data structure 520, as indicated by reference number 740. For example, identifier 730 (e.g., "xxx-xxx-xxxx") may match a device identifier associated with campaign ID 456, the date range associated with campaign ID 456 may be satisfied, and the content requirement associated with campaign ID 456 may be satisfied.

Figure 7D:
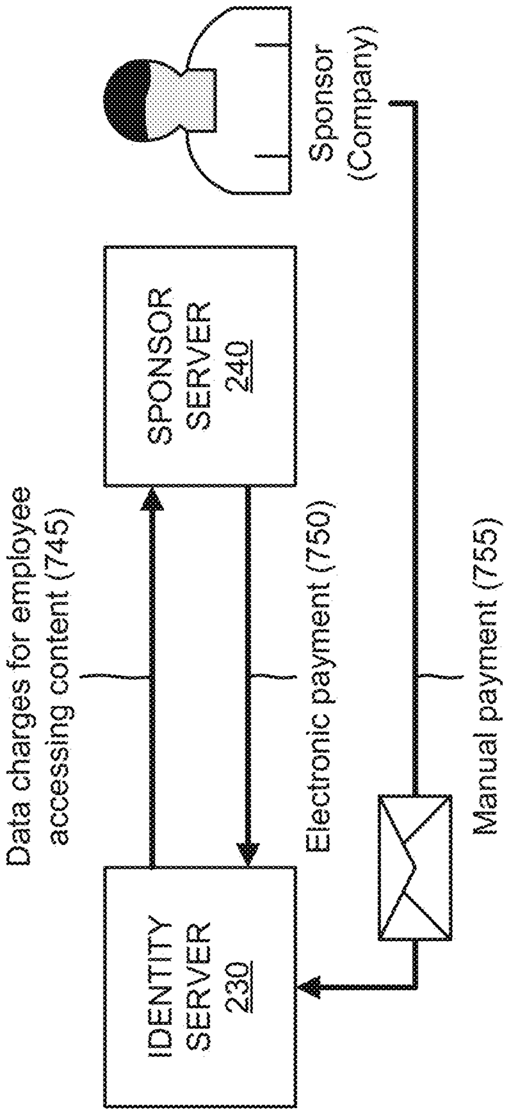

Based on this determination, identity server 230 may identify the company as the sponsor associated with campaign ID 456, and may generate data charges 745 for the employee's access of web site 720, as shown in FIG. 7D. As further shown in FIG. 7D, identity server 230 may provide data charges 745 for the employee's access of web site 720 to sponsor server 240 (e.g., to the company). In some implementations, the company may instruct sponsor server 240 to generate an electronic payment 750 for data charges 745, and to provide electronic payment 750 to an entity associated with identity server 230. In some implementations, the company may generate a manual payment 755 (e.g., a check) for data charges 745, and may provide manual payment 755 (e.g., via mail) to an entity associated with identity server 230.

If the employee accesses other content not sponsored by the company, identity server 230 may generate other data charges for the employee's access of the other content, and may provide the other data charges to the employee. In some implementations, the employee may instruct smart phone 210 to generate an electronic payment for the other data charges, and to provide the electronic payment to identity server 230. In some implementations, the employee may generate a manual payment (e.g., a check) for the other data charges, and may provide the manual payment (e.g., via mail) to an entity associated with identity server 230.

As indicated above, FIGS. 7A-7D are provided merely as an example. Other examples are possible and may differ from what was described with regard to FIGS. 7A-7D. In some implementations, the various operations described in connection with FIGS. 7A-7D may be performed automatically or at the request of the user.

Figure 8A:
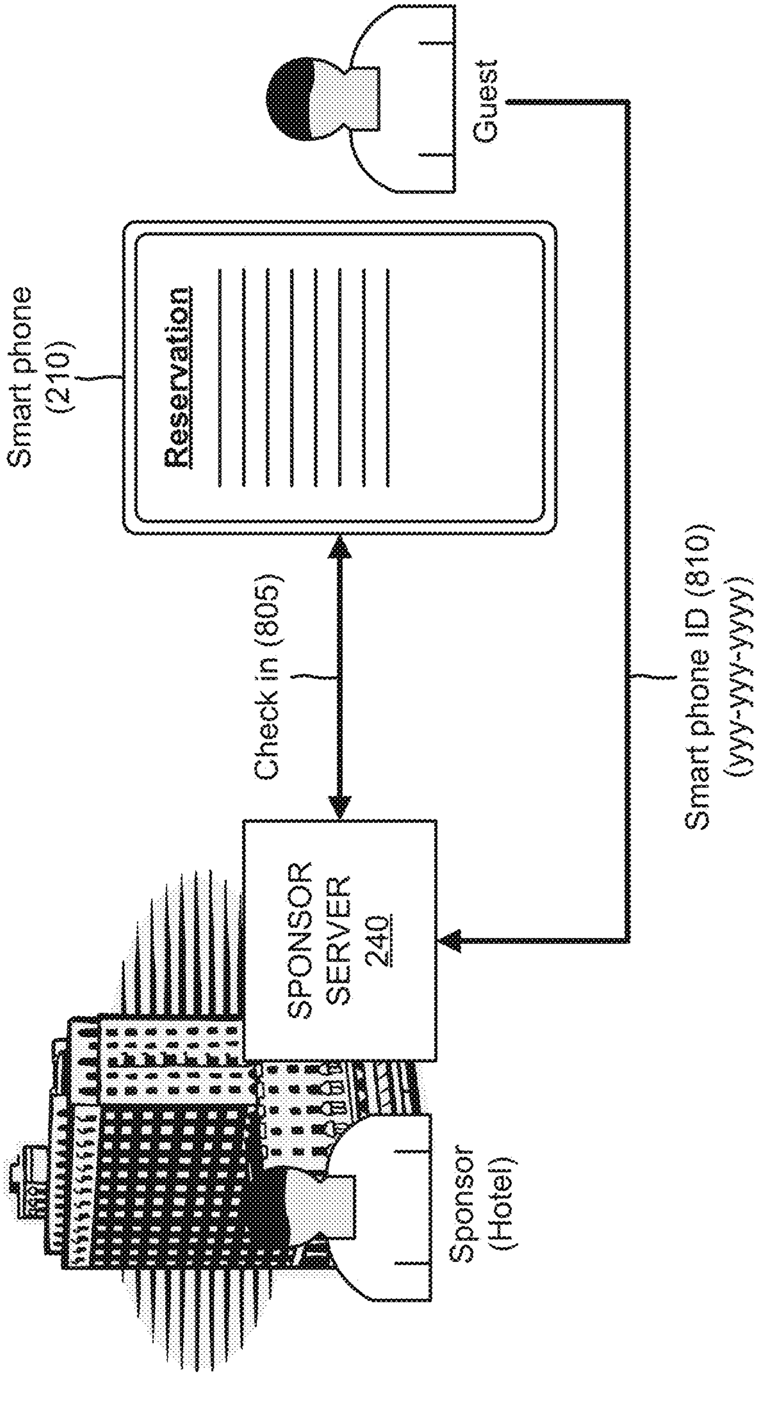
FIG. 8A-8E are diagrams of another example relating to the example process shown in FIG. 6.

FIGS. 8A-8E are diagrams of another example 800 relating to example process 600 shown in FIG. 6. In example 800, assume that a sponsor (e.g., a hotel) is associated with sponsor server 220, and that a guest of the hotel is associated with a user device 210 (e.g., a smart phone 210), as shown in FIG. 8A. As further shown, the guest may check in 805 to the hotel, and an employee of the hotel may inform the guest that the hotel sponsors all data usage by the guest while the guest stays at the hotel. Accordingly, the guest may provide an identifier 810 (e.g., "yyy-yyy-yyyy") of smart phone 210 to the employee, and the employee may input identifier 810 to sponsor server 240.

Figure 8B:
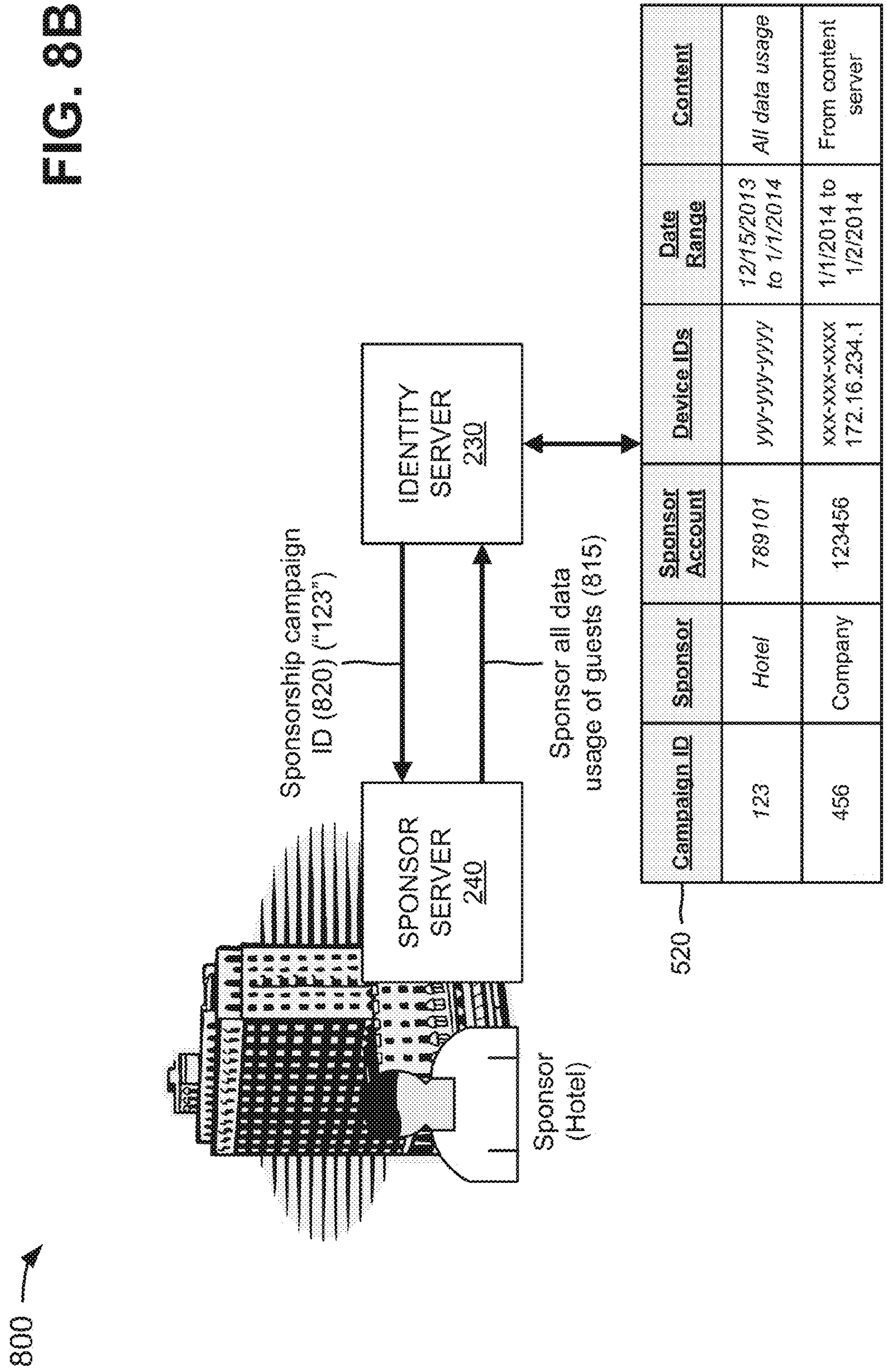

Further, assume that the hotel utilizes sponsor server 240 to sponsor all data usage by the hotel's guests, as indicated by reference number 815 in FIG. 8B. For example, the hotel may utilize sponsor server 240 to access a user interface (e.g., user interface 510, FIG. 5A), provided by identity server 230, that enables the hotel to create a data usage sponsorship campaign for the guests. As shown in FIG. 8B, identity server 230 may store the data usage sponsorship campaign in data structure 520. The data usage sponsorship campaign may include a particular device ID (e.g., "yyy-yyy-yyyy"), a particular date range (e.g., Dec. 15, 2013 to Jan. 1, 2014), and particular content (e.g., all data usage). In some implementations, the hotel's data usage sponsorship campaign may include additional device IDs and/or date ranges associated with other guests of the hotel. As further shown in FIG. 8B, identity server 230 may assign a sponsorship campaign ID 820 (e.g., "123") to the data usage sponsorship campaign, and may provide sponsorship campaign ID 820 to sponsor server 240.

Figure 8C:
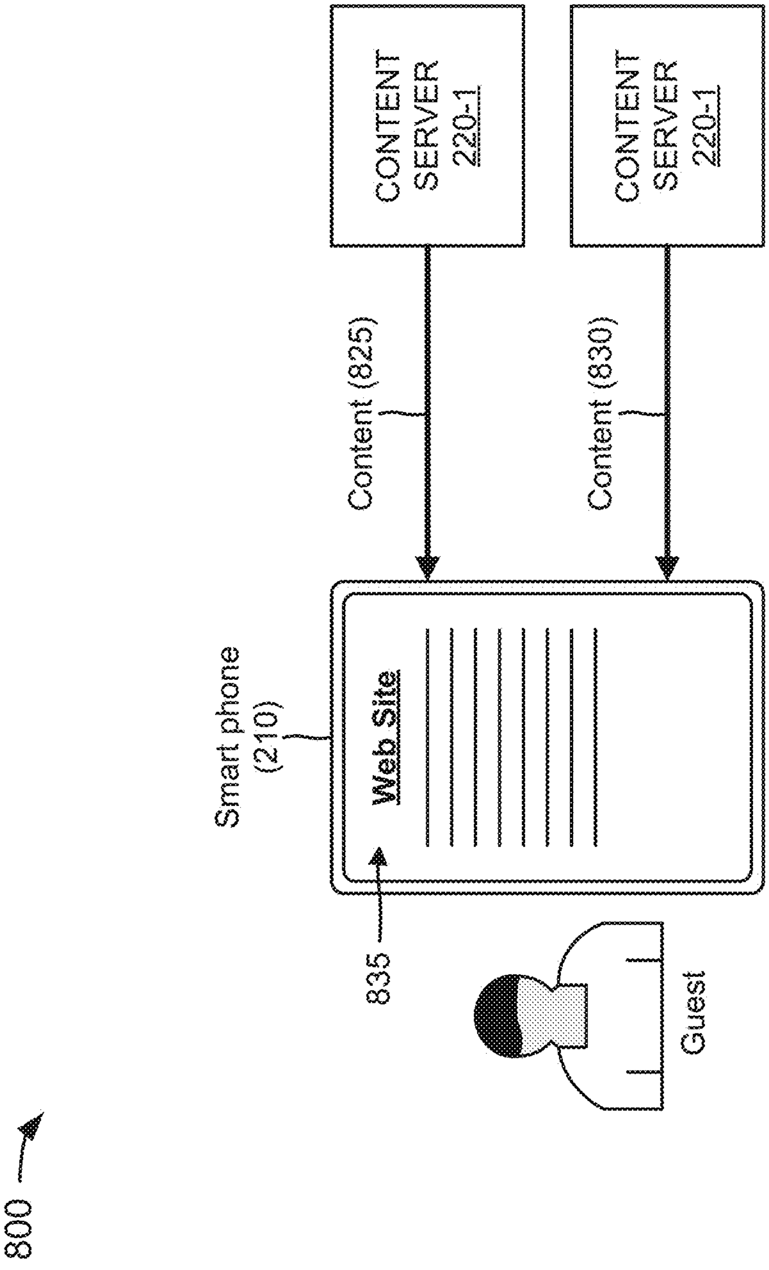

Now assume that the guest utilizes smart phone 210 to access content 825 provided by a first content server 220-1, and to access content 830 provided by a second content server 220-2, as shown in FIG. 8C. For example, the guest may access a web site 835 of the first content server 220-1, and smart phone 210 may display web site 835 to the guest. In some implementations, the guest may also utilize smart phone 210 to access other content provided by other content providers.

Figure 8D:
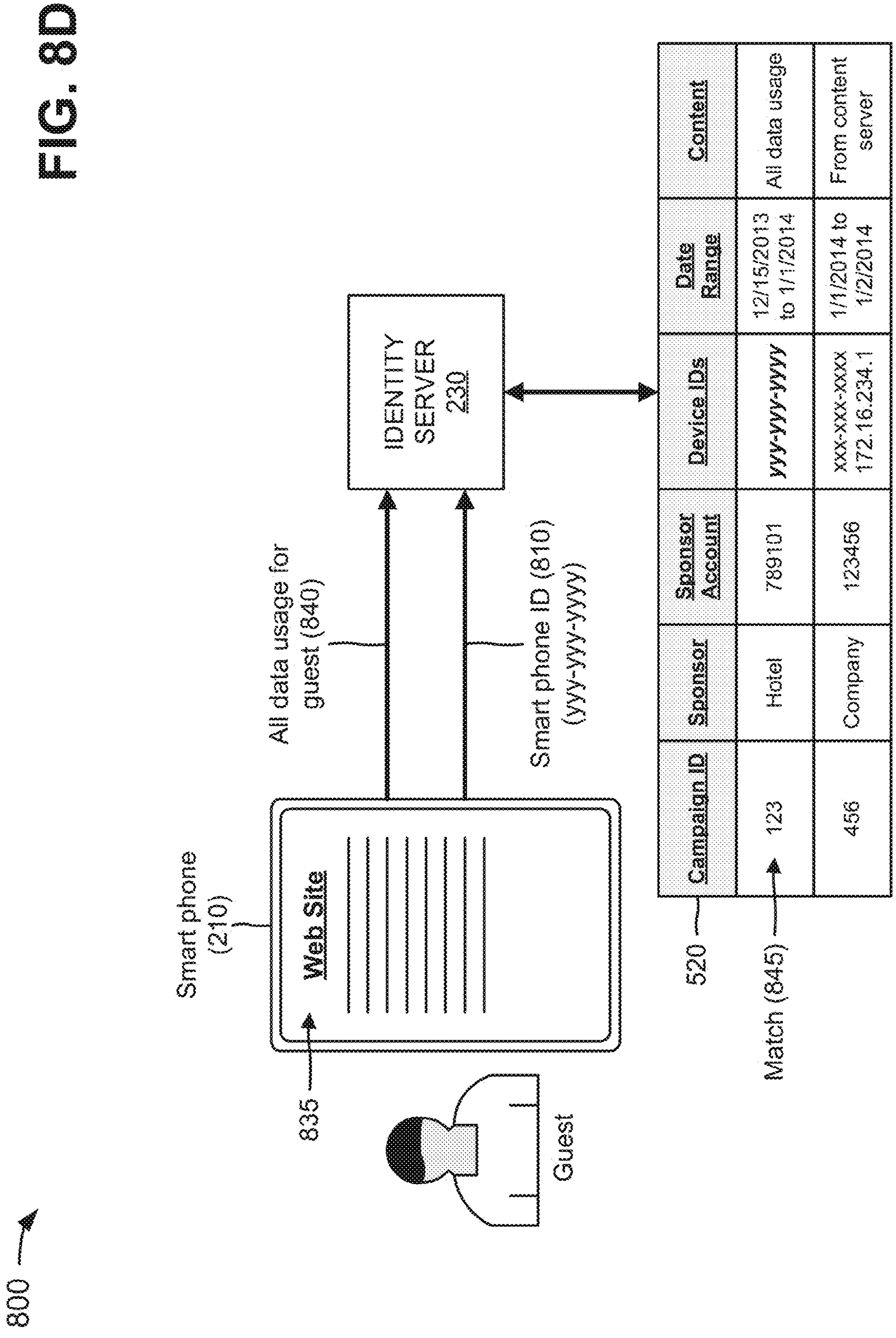

As shown in FIG. 8D, smart phone 210 may forward identifier 810 of smart phone 210 to identity server 230, when smart phone 210 is accessing content 825 and/or content 830. While smart phone 210 accesses content 825 and/or content 830, smart phone 210 may accrue data usage, and information 840 associated with all data usage by smart phone 210 (e.g., the data usage for accessing content 825 and/or content 830) may be provided to identity server 230, as further shown in FIG. 8D. In some implementations, information 840 may include information associated with content 825 and/or content 830, date and time information associated with the access of content 825 and/or content 830, location information of smart phone 210, etc.

In example 800, assume that the guest accesses content 825 and/or content 830 on Dec. 18, 2013. Identity server 230 may compare identifier 810 and information 840 with information provided in data structure 520 in order to determine whether smart phone's 210 data usage for accessing content 825 and/or content 830 is sponsored. Identity server 230 may determine that smart phone's 210 data usage, for accessing content 825 and/or content 830, is sponsored since identifier 810 and information 840 match information provided in data structure 520, as indicated by reference number 845 in FIG. 8D. For example, identifier 810 (e.g., "yyy-yyy-yyyy") may match a device identifier associated with campaign ID 123, the date range associated with campaign ID 123 may be satisfied, and the content requirement associated with campaign ID 123 may be satisfied.

Figure 8E:
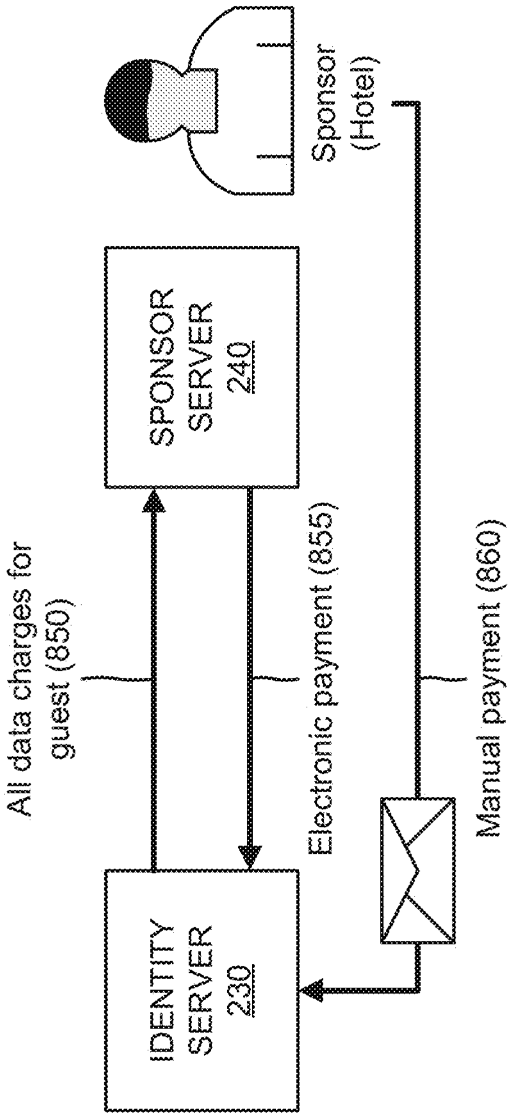

Based on this determination, identity server 230 may identify the hotel as the sponsor associated with campaign ID 123, and may generate data charges 850 for the guest's data usage, as shown in FIG. 8E. As further shown in FIG. 8E, identity server 230 may provide data charges 850 for the guest's data usage to sponsor server 240 (e.g., to the hotel). In some implementations, the hotel may instruct sponsor server 240 to generate an electronic payment 855 for data charges 850, and to provide electronic payment 855 to an entity associated with identity server 230. In some implementations, the hotel may generate a manual payment 860 (e.g., a check) for data charges 850, and may provide manual payment 860 (e.g., via mail) to an entity associated with identity server 230.

As indicated above, FIGS. 8A-8E are provided merely as an example. Other examples are possible and may differ from what was described with regard to FIGS. 8A-8E. In some implementations, the various operations described in connection with FIGS. 8A-8E may be performed automatically or at the request of the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:

receiving, by an identity server device, a request to create a data usage sponsorship campaign from a sponsor server device associated with a sponsor for sponsoring data usage;

receiving, by the identity server device, from the sponsor server device, and based on providing a configuration interface, information for the data usage sponsorship campaign associated with an entity-identifiable group of users, the information for the data usage sponsorship campaign including an entity-selected first date, an entity-selected second date, entity-selected content, and entity-selected cost information;

generating, by the identity server device and based on the request, configuration information for the data usage sponsorship campaign;

configuring, by the identity server device, the data usage sponsorship campaign based on the configuration information;

receiving, by the identity server device and from a content server device, an identifier associated with a user device, the identifier being provided to the identity server device based on embedded code included in particular content accessed by the user device, the embedded code being provided by the identity server device to the content server device, the embedded code enabling the content server device to support the data usage sponsorship campaign, the embedded code including one of an application, a code snippet, a script, or a widget that is embedded in the particular content, and the embedded code causing the user device to provide the identifier to the content server device;

receiving, by the identity server device, information associated with data usage by the user device while the particular content is accessed by the user device;

determining, by the identity server device, whether the data usage is sponsored by the sponsor based on the identifier and the information associated with the data usage, the sponsor sponsoring data usage associated with the particular content accessed by the user device on a first date, the sponsor not sponsoring data usage associated with the particular content accessed by the user device on a second date, the second date being different than the first date, the sponsor sponsoring data usage associated with the particular content accessed by the user device during a first time of day, and the sponsor not sponsoring data usage associated with the particular content accessed by the user device during a second time of day, the second time of day being different than the first time of day; and assigning, by the identity server device, charges for the data usage:

to an account associated with the user device when the data usage is not sponsored by the sponsor, or to an account associated with the sponsor when the data usage is sponsored by the sponsor.

2. The method of claim 1, further comprising:

determining, by the identity server device, the sponsor based on the identifier and the information associated with the data usage; and identifying, by the identity server device, the account associated with the sponsor.

3. The method of claim 1, where the information associated with the data usage includes one or more of:

information associated with a geographic location of the user device during the data usage, or information associated with the particular content accessed by the user device during the data usage.

4. The method of claim 1, where the sponsor sponsors the data usage of the user device based on one or more of:

a geographic location of the user device during the data usage, the particular content accessed by the user device during the data usage, or a threshold associated with the data usage.

5. The method of claim 1, further comprising:

storing, by the identity server device, the configuration information for the data usage sponsorship campaign.

6. The method of claim 1, where the user device is associated with the data usage sponsorship campaign based on the identifier.

7. The method of claim 1, further comprising:

storing the configuration information for the data usage sponsorship campaign.

8. An identity server device comprising:

one or more processors to:

receive, from a sponsor server device associated with a sponsor for sponsoring data usage, a request to create a data usage sponsorship campaign, provide, based on receiving the request, a configuration interface, receive, from the sponsor server device and based on providing the configuration interface, information for the data usage sponsorship campaign associated with an entity-identifiable group of users, the information for the data usage sponsorship campaign including an entity-selected first date, an entity-selected second date, entity-selected content, and entity-selected cost information, generate, based on the request, configuration information for the data usage sponsorship campaign, configure the data usage sponsorship campaign based on the configuration information, the data usage sponsorship campaign sponsoring data usage associated with particular content accessed by a plurality of user devices on a first date;

the data usage sponsorship campaign not sponsoring data usage associated with the particular content accessed by the plurality of user devices on a second date, the second date being different than the first date, the data usage sponsorship campaign sponsoring data usage associated with the particular content accessed by the plurality of user devices during a first time of day, and the data usage sponsorship campaign not sponsoring data usage associated with the particular content accessed by the plurality of user devices during a second time of day, the second time of day being different than the first time of day;

receive an identifier associated with a user device, of the plurality of user devices, from a content server device, the identifier being provided to the identity server device based on embedded code included in the particular content accessed by the user device, the embedded code being provided by the identity server device to the content server device, the embedded code enabling the content server device to support the data usage sponsorship campaign, the embedded code including one of an application, a code snippet, a script, or a widget that is embedded in the particular content, and the embedded code causing the user device to provide the identifier to the content server device, receive information associated with data usage by the user device while the particular content is accessed by the user device, determine whether the data usage is included in the data usage sponsorship campaign based on the identifier and the information associated with the data usage, determine the sponsor based on the identifier and the information associated with the data usage, identify an account associated with the sponsor, and assign charges for the data usage:

to an account associated with the user device when the data usage is not included in the data usage sponsorship campaign, or to the account associated with the sponsor when the data usage is included in the data usage sponsorship campaign.

9. The identity server device of claim 8, where the one or more processors are further to:

store the configuration information for the data usage sponsorship campaign.

10. The identity server device of claim 8, where the information associated with the data usage includes one or more of:

information associated with a geographic location of the user device during the data usage, or information associated with the particular content accessed by the user device during the data usage.

11. The identity server device of claim 8, where the data usage sponsorship campaign sponsors data usage associated with on one or more of:

a particular geographic location, or a particular data threshold.

12. The identity server device of claim 8, where the data usage sponsorship campaign sponsors data usage by one or more user devices, of the plurality of user devices, associated with the sponsor.

13. The identity server device of claim 8, where the one or more processors are further to:

assign a portion of the charges for the data usage to the account associated with the user device; and assign a remaining portion of the charges for the data usage to the account associated with the sponsor.

14. The identity server device of claim 8, where the one or more processors are further to:

assign a portion of the charges for the data usage to the account associated with the sponsor when the data usage is sponsored by the sponsor.

15. A non-transitory computer-readable medium for storing instructions, the instructions comprising:

one or more instructions that, when executed by one or more processors of an identity server device, cause the one or more processors to:

receive, from a sponsor server device associated with a sponsor for sponsoring data usage, a request to create a data usage sponsorship campaign;

receive, from the sponsor server device and based on providing a configuration interface, information for a data usage sponsorship campaign associated with an entity-identifiable group of users, the information for the data usage sponsorship campaign including an entity-selected first date, an entity-selected second date, entity-selected content, and entity-selected cost information;

generate, based on the request, configuration information for the data usage sponsorship campaign;

configure the data usage sponsorship campaign based on the configuration information;

store the configuration information for the data usage sponsorship campaign;

receive, from a content server device, an identifier associated with a user device, the identifier being provided to the identity server device based on embedded code included in particular content accessed by the user device, the user device being associated with the data usage sponsorship campaign based on the identifier, the embedded code being provided by the identity server device to the content server device, the embedded code enabling the content server device to support the data usage sponsorship campaign, the embedded code including one of an application, a code snippet, a script, or a widget that is embedded in the particular content, and the embedded code causing the user device to provide the identifier to the content server device, receive information associated with data usage by the user device while the particular content is accessed by the user device, determine whether the data usage is sponsored by the sponsor based on the identifier and the information associated with the data usage, the sponsor sponsoring data usage associated with the particular content accessed by the user device on a first date, the sponsor not sponsoring data usage associated with the particular content accessed by the user device on a second date, the second date being different than the first date, the sponsor sponsoring data usage associated with the particular content accessed by the user device during a first time of day, and the sponsor not sponsoring data usage associated with the particular content accessed by the user device during a second time of day, the second time of day being different than the first time of day, and assign charges for the data usage:

to an account associated with the user device when the data usage is not sponsored by the sponsor, or to an account associated with the sponsor when the data usage is sponsored by the sponsor.

16. The computer-readable medium of claim 15, where the instructions further comprise:

one or more instructions that, when executed by the one or more processors, cause the one or more processors to:

determine the sponsor based on the identifier and the information associated with the data usage, and identify the account associated with the sponsor.

17. The computer-readable medium of claim 15, where the information associated with the data usage includes one or more of:

information associated with a geographic location of the user device during the data usage, or information associated with the particular content accessed by the user device during the data usage.

18. The computer-readable medium of claim 15, where the sponsor sponsors the data usage of the user device based on one or more of:

a geographic location of the user device during the data usage, the particular content accessed by the user device during the data usage, or a threshold associated with the data usage.

19. The computer-readable medium of claim 15, where the instructions further comprise:

one or more instructions that, when executed by the one or more processors, cause the one or more processors to:

assign a portion of the charges for the data usage to the account associated with the user device; and assign a remaining portion of the charges for the data usage to the account associated with the sponsor.

20. The computer-readable medium of claim 15, where the instructions further comprise:

one or more instructions that, when executed by the one or more processors, cause the one or more processors to:

assign a portion of the charges for the data usage to the account associated with the sponsor when the data usage is sponsored by the sponsor.

* * * * *